US011118685B2

(12) United States Patent
Tanner et al.

(10) Patent No.: US 11,118,685 B2
(45) Date of Patent: Sep. 14, 2021

(54) MULTI-LAYERED PTFE RADIAL LIP SEAL

(71) Applicant: Garlock Sealing Technologies, LLC, Palmyra, NY (US)

(72) Inventors: T. Scott Tanner, Rochester, NY (US); Michael P. McNally, Newark, NY (US); Joseph D. Young, Webster, NY (US); Stefan Pitolaj, Macedon, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 114 days.

(21) Appl. No.: 16/005,996

(22) Filed: Jun. 12, 2018

(65) Prior Publication Data

US 2018/0355977 A1 Dec. 13, 2018

Related U.S. Application Data

(60) Provisional application No. 62/518,480, filed on Jun. 12, 2017.

(51) Int. Cl.
 *F16J 15/3284* (2016.01)
 *F16J 15/3228* (2016.01)
 (Continued)

(52) U.S. Cl.
 CPC ....... *F16J 15/3284* (2013.01); *F16J 15/3228* (2013.01); *F16J 15/3204* (2013.01); *F16J 15/3252* (2013.01)

(58) Field of Classification Search
 CPC .. F16J 15/3228; F16J 15/3232; F16J 15/3252; F16J 15/3284; F16J 15/3204
 See application file for complete search history.

(56) References Cited

U.S. PATENT DOCUMENTS 2,804,325 A * 8/1957 Riesing ............... F16J 15/3244
277/559
2,932,535 A * 4/1960 Peickii ............... F16J 15/3284
277/560

(Continued)

FOREIGN PATENT DOCUMENTS

CN 201129459 Y 10/2008
CN 201875142 U 6/2011
(Continued)

OTHER PUBLICATIONS

International Search Report and Written Opinion dated Oct. 2, 2018 for International Application No. PCT/US2018/036945.

(Continued)

*Primary Examiner* — Nicholas L Foster
(74) *Attorney, Agent, or Firm* — Perkins Coie LLP

(57) ABSTRACT

A multi-layered lip seal comprising a dynamic layer optionally having a filler incorporated therein and a static layer optionally having a filler incorporated therein is described. The lip seal has an annular ring shape, wherein an inner diameter of the ring shape is curved in an axial direction so as to give the lip seal a J-shape when viewed from a cross-sectional perspective. Fillers that can be included in static layer include stiffening filler, reinforcement fillers, conductive fillers and/or abrasion resistance fillers. Fillers that can be included in the dynamic layer include wear resistance fillers. The use of specific fillers in specific layers of the multi-layered lip seal allows for certain segments of the lip seal to be imparted with the benefits of the filler without negatively impacting other segments of the lip seal.

16 Claims, 6 Drawing Sheets

(51) Int. Cl.
*F16J 15/3204* (2016.01)
*F16J 15/3252* (2016.01)

(56) References Cited

U.S. PATENT DOCUMENTS

| | | | |
|---|---|---|---|
| 2,951,721 A | 9/1960 | Asp | |
| 3,549,445 A * | 12/1970 | McMahon | F16J 15/3228 156/222 |
| 3,801,114 A * | 4/1974 | Bentley | F16J 15/3228 277/559 |
| 3,938,813 A | 2/1976 | Forch | |
| 4,583,749 A * | 4/1986 | Hatch | F16J 15/3284 277/551 |
| 4,664,392 A * | 5/1987 | Hatch | F16J 15/3228 277/551 |
| 4,844,485 A * | 7/1989 | Antonini | F16J 15/164 277/553 |
| 5,039,112 A | 8/1991 | Ulrich et al. | |
| 5,083,802 A * | 1/1992 | Shimasaki | F16J 15/3276 277/558 |
| 5,209,502 A * | 5/1993 | Savoia | F16J 15/3228 277/562 |
| 5,702,015 A | 12/1997 | Giles et al. | |
| 6,079,715 A * | 6/2000 | Johnen | F16J 15/3228 277/551 |
| 6,688,603 B2 * | 2/2004 | vom Schemm | F16J 15/3216 277/549 |
| 7,172,201 B2 * | 2/2007 | Uhrner | F16J 15/3228 277/551 |
| 9,851,010 B2 * | 12/2017 | Humblot | F16J 15/3204 |
| 10,041,596 B2 * | 8/2018 | Koch | B65G 15/54 |
| 2005/0098959 A1 * | 5/2005 | Uhrner | F16J 15/3244 277/500 |
| 2005/0151322 A1 * | 7/2005 | Kobayashi | F16J 15/3228 277/309 |
| 2012/0001395 A1 * | 1/2012 | Kurth | F16J 15/3284 277/412 |
| 2012/0306160 A1 * | 12/2012 | Koch | F16J 15/3204 277/558 |
| 2013/0200575 A1 * | 8/2013 | Humblot | F16J 15/3204 277/549 |
| 2017/0030468 A1 * | 2/2017 | Badrossamay | C09K 3/1009 |

FOREIGN PATENT DOCUMENTS

| | | |
|---|---|---|
| EP | 1888950 B1 | 1/2011 |
| EP | 2278198 A1 | 1/2011 |
| JP | 2005155591 A | 6/2005 |
| KR | 10-2000-0052368 | 8/2000 |

OTHER PUBLICATIONS

EP Application No. 18816608.6, Extended European Search Report, dated Jan. 29, 2021, 7 pgs.

\* cited by examiner

MULTI-LAYERED PTFE RADIAL LIP SEAL

CROSS REFERENCE TO RELATED APPLICATIONS

The present application claims priority to U.S. Provisional Patent Application No. 62/518,480, filed Jun. 12, 2017, the entirety of which is hereby incorporated by reference.

TECHNICAL FIELD

The present application relates to multi-layered lip seals, and more specifically to multi-layered lip seals using specific fillers within specific layers in order to impart the benefits of the fillers to certain components of the lip seal without negatively impacting other components of the lip seal.

BACKGROUND

Radial lip seals are generally used to prevent fluids (e.g., liquids and gases) from leaving a housing that is penetrated by a rotating shaft. FIG. 1 illustrates an exemplary prior art radial lip seal 100 used in conjunction with a rotating shaft 110. The radial lip seal 100 has a generally annular shape such that it surrounds the rotating shaft 110. As shown in FIG. 1, the radial lip seal 100 includes a curved seal element 105, a portion of which is sandwiched between inner and outer portions of a two-part housing 120. The radial lip seal 100 may also include a secondary seal 130, which as shown in FIG. 1, can be situated between the curved seal element 105 and one part of the two-part housing 120.

As shown in FIG. 1, the curved seal element 105 is curved at its radial inner end inner diameter so that the seal element 105 transitions from being oriented in a radial direction at the radial outer end to being oriented in an axial direction at its radial inner end. The curved seal element 105 can be said to have a J-shape (when viewed from a cross-sectional perspective as shown in FIG. 1). The axially oriented portion 101 of the J-shaped seal element 105 presses against the rotating shaft 110 to thereby effect a seal.

FIGS. 2A-2D illustrate other previously known configurations of radial lip seals in two-part casings similar to the configuration shown in FIG. 1. In FIG. 2A, the curved seal element 205 is curved in a opposite direction than is shown in the FIG. 1. In FIG. 2B, two curved seal elements 205a, 205b are provided, with each curved in an opposing direction. FIG. 2C shows a similar configuration to FIG. 2B, but with a second secondary seal 230 disposed between the curved seal elements 205a, 205b. Finally, FIG. 2D shows a configuration that includes two seal elements 205a, 205b, each curved in the same direction.

The radial lip seals described above produce the desired sealing effect through radial contact pressure on the shaft, which is generated by a combination of designed-in interference (preload) and pressure activation from the sealed media. Some lip seal designs (not shown) employ an external spring as an additional source of seal pressure. Typical applications for radial lip seals include compressors, blowers, mills/grinders, mixers/agitators, pumps, gearboxes and turbine engines.

Polytetrafluoroethylene (PTFE) is a popular lip seal material because of its broad chemical resistance, high melting point, low coefficient of friction, inertness, and its ability to run dry. Unfortunately, PTFE suffers from poor wear resistance, is relatively soft, and is subject to creep (especially at elevated temperatures). The poor wear resistance of a PTFE radial lip seal is shown in FIG. 3. As shown in FIG. 3, wear on the curved seal element 305 is focused on the heel 306 of the J-shaped seal element 305, resulting in the squaring off of the seal element 305 and the creation of an L-shaped seal element 305. This squaring off can subsequently lead to a tear in the seal element 305 and destroyed sealing.

As a result of the problematic characteristics of PTFE when used as a lip seal material, fillers are sometimes added to the PTFE to, for example, reduce unwanted creep and improve the wear resistance and tensile properties of the virgin PTFE. The choice of filler is highly application-dependent and no filler addresses all the deficiencies of PTFE. In some cases, the filler provides a positive benefit but also causes other problems. For example, some fillers reduce wear but increase the coefficient of friction and the abrasive effect of the radial lip seal on the counterface.

Accordingly, a need exists for a PTFE-based radial lip seal that maximizes the positive attributes of using fillers but reduces or eliminates some of the negative impacts that fillers may have on a radial lip seal.

SUMMARY

This Summary is provided to introduce a selection of concepts in a simplified form that are further described below in the Detailed Description. This Summary, and the foregoing Background, is not intended to identify key aspects or essential steps of the claimed subject matter. Moreover, this Summary is not intended for use as an aid in determining the scope of the claimed subject matter.

Described herein are various embodiments of a multi-layered PTFE radial lip seal suitable for use in sealing a rotating shaft in a housing. The multi-layered PTFE radial lip seal described herein allows for a dynamic surface of the lip seal to be imparted with specific properties through the use of specially selected fillers independent of the static surface and vice versa. Each layer of the multi-layered radial lip seal includes unique fillers that impart beneficial properties to the dynamic surface and/or the static surface and to the multi-layered lip seal overall.

In some embodiments, the multi-layered radial lip seal has an annular shape wherein the inner diameter of the lip seal is curved in an axial direction to thereby give the annular seal a J-shape when viewed from a cross-sectional perspective. The lip seal includes a first layer and a second layer abutting the first layer. The exterior surface of the first layer may be the dynamic surface of the lip seal and the exterior surface of the second layer may be the static surface of the lip seal. The interior surfaces of the first layer and the second layer abut one another. In such configurations, the inner diameter of the lip seal should be curved in a direction such that the outer rounded portion of the J-shaped lip seal is the exterior surface of the first layer (i.e., the dynamic surface).

In some embodiments, the first layer comprises PTFE with a first filler and the second layer comprises PTFE with either no filler or a second filler. The reverse configuration is also contemplated (i.e., the second layer comprises PTFE with a second filler and the first layer comprises PTFE with either no filler or a first filler). The first and/or second filler can be selected to impart the respective first layer and second layer with specific beneficial properties. This allows for each layer to have beneficial properties independent of the other layer.

Also described herein are embodiments of a method for manufacturing a multi-layered radial lip seal. In some embodiments, the method generally involves calendaring together a first PTFE layer and a second PTFE layer (each optionally including filler), drying the layers to remove any solvent in the first and second PTFE layers, and sintering the first and second layers to fuse the two layers together and form a multi-layered structure. Significantly, the method does not use adhesive to fuse together the first and second layers and produces an adhesive-free structure.

BRIEF DESCRIPTION OF THE DRAWINGS

Non-limiting and non-exhaustive embodiments of the disclosed flexible sealing assembly, including the preferred embodiment, are described with reference to the following figures, wherein like reference numerals refer to like parts throughout the various views, uncles otherwise specified.

DETAILED DESCRIPTION

Embodiments are described herein more fully below with reference to the accompanying Figures, which form a part hereof and show, by way of illustration, specific exemplary embodiments. These embodiments are disclosed in sufficient detail to enable those skilled in the art to practice the invention. However, the embodiments may be implemented in many different forms and should not be construed as being limited to the embodiments set forth herein. The following Detailed Description is, therefore, not to be taken in a limiting sense.

Figure 4:
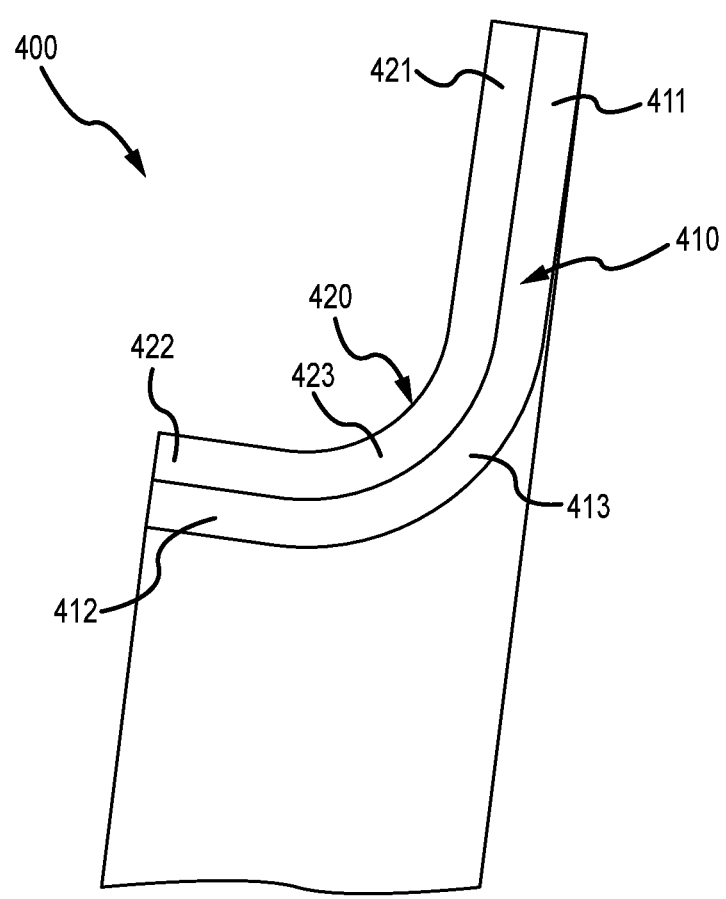
FIG. 4 is a cross-sectional perspective view of a multi-layered lip seal according to various embodiments described herein.

With reference to FIG. 4, a multi-layered radial lip seal 400 is shown including a first layer 410 and a second layer 420. The first layer 410 can also be considered the exterior layer of the lip seal 400 since the lip seal 400 is configured such that the first layer 410 contacts the surface to be sealed. The second layer 420 can also be considered the interior layer of the lip seal 400 since lip seal 400 is configured such that the second layer 420 does not contact the surface to be sealed.

Both layers 410, 420 have an annular shape such that the lip seal 400 has the form an annular ring. Layers 410, 420 will typically have complimentary dimensions and shapes so that the layers 410, 420 fit together snugly when paired together. The dimensions of the layers 410, 420 can also be designed so that the terminal ends of the first layer 410 are even (i.e., planar) with the terminal ends of the second layer 420 as shown in FIG. 4.

FIG. 4 shows that the first layer 410 and the second layer 420 are directly fused to one another (i.e., there is no intermediate layer between the first layer 410 and the second layer 420). The manner in which the first layer 410 is secured directly to the second layer 420 is described in greater detail below.

FIG. 4 also that each layer 410, 420 includes a radially oriented segment 411, 421, an axially oriented segment 412, 422, and a curved segment 413, 423 between the radially oriented segment and the axially oriented segment, such that the lip seal 400 forms a generally J-shape (when viewed from a cross sectional perspective). The axial direction in which the lip seal 400 is curved is such that the first layer 410 is the exterior layer (i.e., layer that contacts the surface to be sealed and provides the dynamic surface).

Both the first and second layers 410, 420 comprise PTFE. Additionally, either or both layer may include one or more fillers. The type of filler included in the first and/or second layer 410, 420 is generally not limited, though the filler is typically selected because of the beneficial property or properties the filler imparts to the layer in which it is included. The amount of filler included in the first and/or second layer 410, 420 is generally not limited, provided the amount of filler used provides a beneficial property to the layer in which it is incorporated.

In some embodiments, the second layer 420 (i.e., the static layer) comprises PTFE and a filler that stiffens the static layer 420, modifies the elastic modulus of the static layer 420, and or generally mechanically reinforces the static layer 420. This helps to ensure the dynamic layer 410 remains evenly pressed against the rotating shaft and creates a good seal. The benefit of including such a filler in only the static layer 420 is that the filler does not impact the dynamic layer 410 in any negative ways. Exemplary fillers that can be used to stiffen the static layer 420 include stainless steel and carbon. Such fillers are homogenously blended with the PTFE so that they are provided throughout the static layer 420.

Reinforcement of the multilayered lip seal 400 is also possible through the use of fabric reinforcement. Such fabric reinforcement may be mixed into the static layer 420 or be used between the static layer 420 and the dynamic layer 410. In some embodiments, the fabric reinforcement is provided in the form of chopped fiber, such as chopped fiber homogenously mixed with PTFE to form the static layer 420. In some embodiments, the fabric reinforcement is provided in the form of one or more woven sheets that are disposed between the dynamic layer 410 and the static layer 420 and/or incorporated within the static layer 420. The fabric reinforcement, whether in the form of woven sheets or chopped fiber, can be, for example, metallic or non-metallic and organic or inorganic.

In some embodiments, the second layer 420 (i.e., the static layer) comprises PTFE and fillers that will conduct heat away from the dynamic layer 410 which thereby allows the dynamic layer 410 to run cooler. Reduced temperature at the dynamic layer 410 surface will generally reduce the wear of the lip seal 400 at the dynamic layer 410 surface. Exemplary fillers that can be used to conduct heat away from the dynamic layer 410 surface include metallic filler such as stainless steel and bronze.

In some embodiments, the second layer 420 (i.e., the static layer) comprises PTFE and fillers that improve the abrasion resistance of the static layer 420. Improving the abrasion resistance of the static layer 420 is especially useful when the seal 400 is used in the presence of abrasive media. The inclusion of a filler that improves abrasion resistance protects both the static layer 420 that is directly impacted by abrasive media and the dynamic layer 410 surface, which is protected by the static layer 420. Exemplary fillers that can be used to improve the abrasion resistance of the static layer 420 include metallic or inorganic filler. Specific examples include glass or carbon fiber.

In some embodiments, the first layer 410 (i.e., the dynamic layer) comprises PTFE and fillers that improve the wear resistance of the dynamic layer 410. In some embodiments, inclusion of such fillers can improve the wear resistance of the dynamic layer 410 by one or two orders of magnitude. High shear fillers are believed to improve wear resistance in the dynamic layer 410 by interfering with the subsurface shearing of the PTFE. In some embodiments, the fillers added to improve wear resistance are solid lubricants or high temperature thermoplastics. These fillers can be added to the dynamic layer 410 without negatively impacting the coefficient of friction of the dynamic layer 410.

While the above described multi-layered lip seal generally contemplates the use of a first layer and a second layer directly abutting the first layer, intermediate layers can also be used in the multi-layered lip seal. For example, a layer of spring steel can be provided between the first and second layers to improve the tracking properties of the seal. In some embodiments, this layer of spring steel is effectively encapsulated by the first layer and the second layer, which thereby effectively protects the layer of spring steel from, for example, abrasive media. This is an improvement over previous known lips seals that incorporate a coil spring that sits on the curved portion of the lip seal and is fully exposed to abrasive media.

Such supporting layers can also be incorporated within the individual layers of the seal. For example, a reinforcement layer can be incorporated within the static layer 420 to impart toughness and stiffness to the lip seal. An exemplary reinforcement layer is woven monofilament cloth. Spring steel layers can also be incorporated within either the static layer of the dynamic layer.

The external surfaces of the first and/or second layers 410, 420 can be coated with material to, for example, reduce the permeability of either or both layers. In some embodiments, a thin layer of PTFE is coated on either or both external surfaces of the first and second layers 410, 420. This improves the performance of the lip seal in Steam-In-Place (SIP) applications and reduces pick up during certification testing.

Some primary benefits of the multi-layer radial lip seal described herein include a) including fillers in a specific layer of the lip seal where the inclusion of the filler in the other layer may negatively impact the overall performance of the lip seal and b) localizing the filler in specified layer to thereby use only the quantity of filler needed and thus reducing costs.

Figure 5:
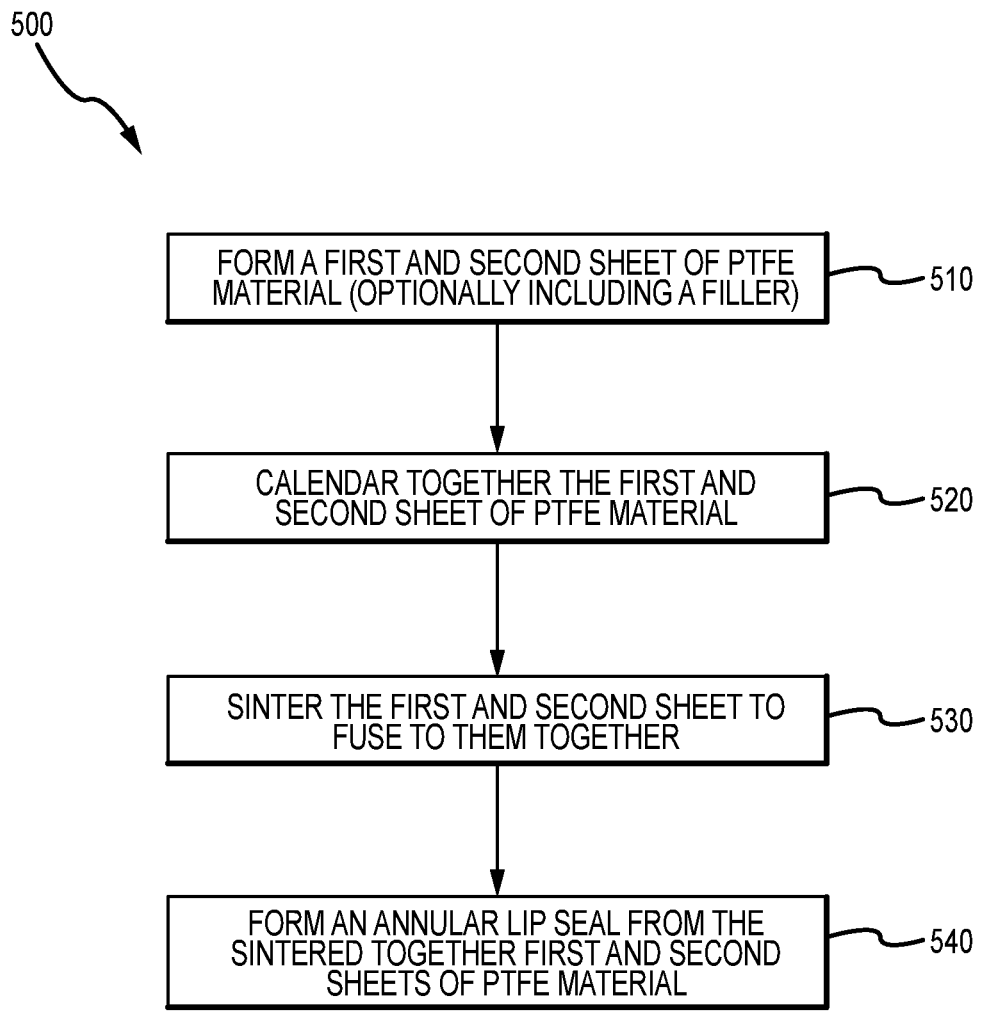
FIG. 5 is a flow diagram illustrating a method of manufacturing a multi-layered lip seal according to various embodiments described herein.

FIG. 5 illustrates a method 500 of manufacturing a multi-layered radial lip seal that significantly does not include the use of adhesive. Eliminating adhesive from the lip seal is beneficial in that the lip seal retains its chemical resistance properties and avoids the possibility of adhesive contamination problems.

The method 500 generally includes a step 510 of forming a first and second sheet of PTFE material, with each sheet optionally including one or more fillers, a step 520 of calendaring the first and second sheet of material together, a step 530 of sintering the first and second sheets together, and a step 540 of forming the annular lip seal from the combined sheet.

In step 510, the first and second layers are formed by first mixing together PTFE and any desired filler for the specific layer being formed. The mixture can further include Stoddard solvent. Any manner of thoroughly mixing these components together can be used. In some embodiments, the components are mixed together using a V-blender. Formation of the layers further includes filtering and pressing the mixture to form cakes of the mixed material. These cakes can then be made into sheets using, for example, a multi-calendaring process. The result is a sheet of both the first layer and the second layer.

Figure 6:
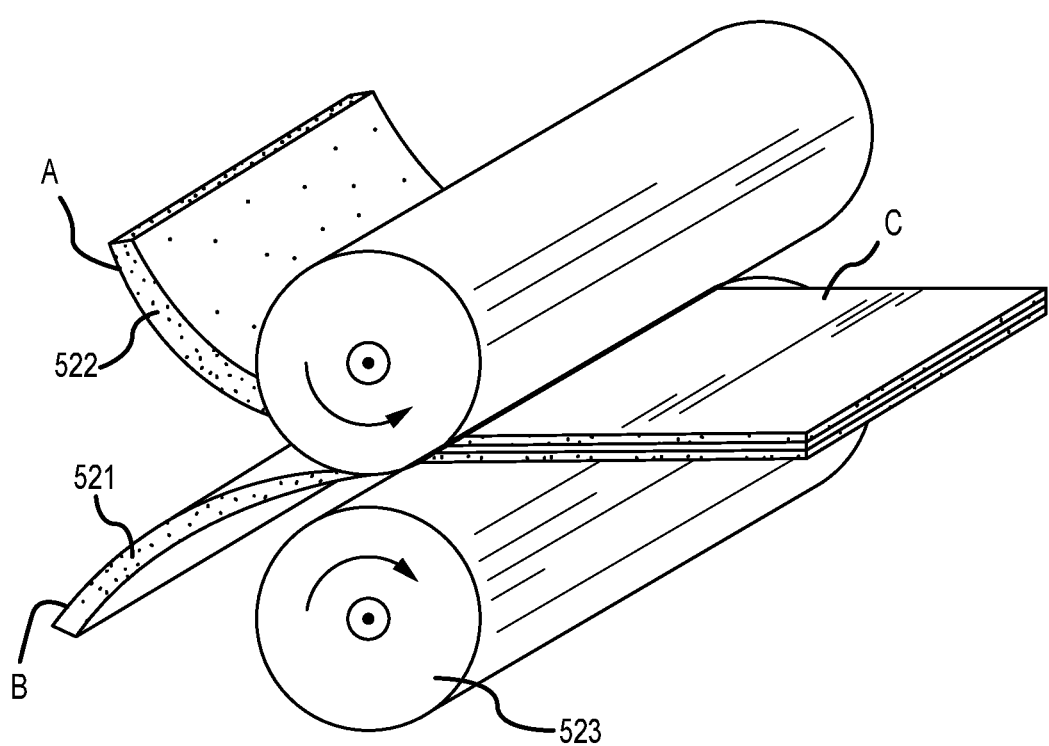
FIG. 6 is a schematic view of a calendaring process suitable for use in the manufacture of the multi-layered lip seal according to various embodiments described herein.

In step 520, a calendaring process is used to bring together the first layer and second layer. FIG. 6 illustrates this step wherein the first layer 521 and the second layer 522 are calendared together through a rolling apparatus 523. Any type of calendaring process and equipment can be used provided the end result is the first and second layer being joined together into a layered composite sheet.

In step 530, the layered composite sheet is subjected to further processing that results in the fusing together of the two layers, such as by sintering the two layers together. In advance of this sintering step, the layered composite structure can be dried to remove any residual Stoddard solvent. Any suitable temperature can be used to carry out the sintering step, such as at a temperature of about 680° F. Again, the result of the sintering step is to fuse together the two layers so that a combined sheet is formed, with the layers being joined together without the need for or use of adhesive.

Figure 1:
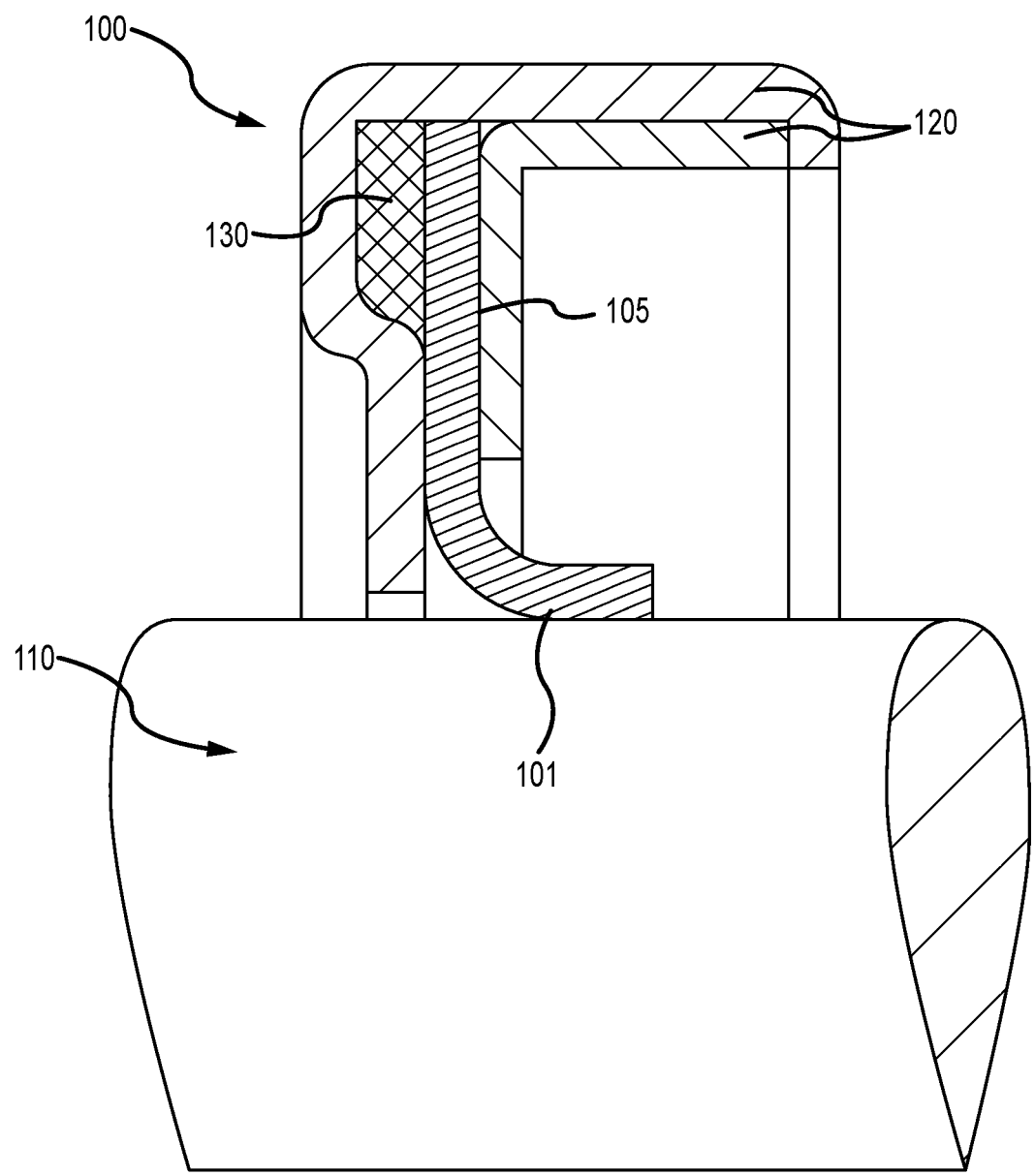
FIG. 1 illustrates a configuration of a radial lip seal used in conjunction with a rotating shaft according to the prior art.
Figure 2:
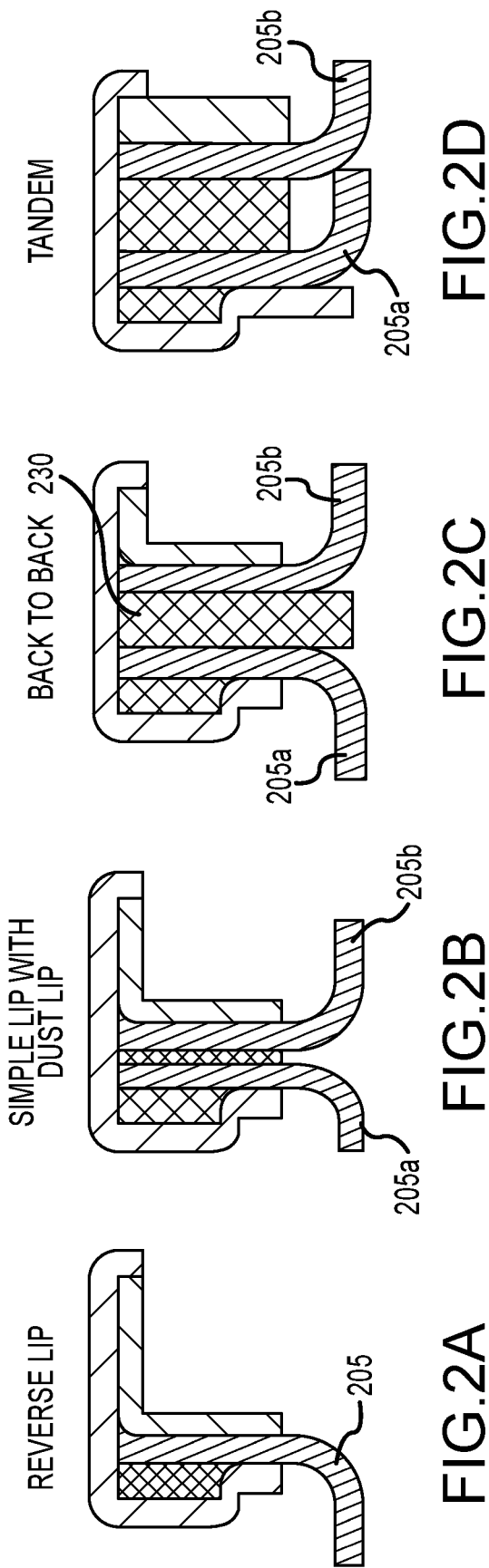
FIGS. 2A to 2D illustrate various configurations of a radial lip seal in a casing according to the prior art.
Figure 3:
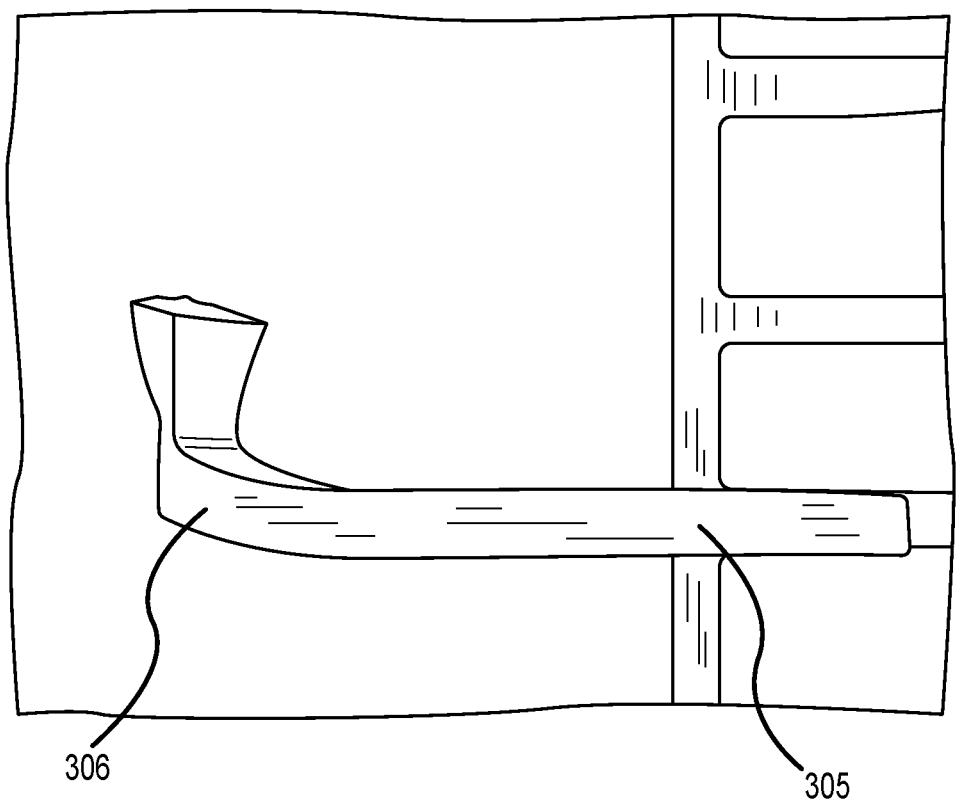
FIG. 3 illustrates a worn radial lip seal according to the prior art.

In step 540, the composite sheet is used to form the annular lip seal. This can include cutting an annular ring from the sheet to thereby form the general annular shape of the resultant lip seal. In order to form the desired J cross-sectional shape, the annular lip seal is placed over a tapered mandrel (i.e., the tapered mandrel passes through the inner diameter of the annular ring). The application of downward force on the tapered mandrel ultimately causes the inner diameter edge of the annular ring to stretch in a direction opposite to the application of force at the point where the diameter of the mandrel exceeds the inner diameter of the annular ring. The annular ring is then removed from the mandrel and is left with a curved inner diameter. The lip seal is subsequently ready to be clamped between an inner and outer casing as shown in FIG. 1.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all numbers or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more or ending with a maximum value of 10 or less (e.g., 5.5 to 10, 2.34 to 3.56, and so forth) or any values from 1 to 10 (e.g., 3, 5.8, 9.9994, and so forth).

We claim:

1. A multi-layered lip seal, comprising:
  a dynamic layer comprising a radially oriented segment, an axially oriented segment, and a curved segment intermediate the radially oriented segment and the axially oriented segment, wherein the axially oriented segment extends only in an axial direction and is configured to contact a surface to be sealed over a majority of a length of the axially oriented segment of the dynamic layer;
  a static layer fused to the dynamic layer along their corresponding lengths such that an interface between the static layer and dynamic layer is adhesive free and comprising a radially oriented segment, an axially oriented segment, and a curved segment intermediate the radially oriented segment and the axially oriented segment, wherein the axially oriented segment is configured to be separated from the surface to be sealed by the dynamic layer over a majority of a length of the axially oriented segment of the static layer;
  wherein the dynamic layer comprises PTFE and the static layer comprises PTFE, and each of the dynamic layer and the static layer comprises at least one filler homogenously distributed throughout the PTFE, wherein the at least one filler is selected from a group of fillers consisting of: a stiffening filler, a reinforcement filler, a conductive filler, an abrasion resistance filler, a wear resistance filler, or a combination thereof.

2. The multi-layered lip seal of claim 1, wherein the at least one filler of the static layer comprises a stiffening filler.

3. The multi-layered lip seal of claim 2, wherein the stiffening filler comprises stainless steel or carbon.

4. The multi-layered lip seal of claim 1, wherein the at least one filler of the static layer comprises a reinforcement filler.

5. The multi-layered lip seal of claim 4, wherein the reinforcement filler is chopped fiber.

6. The multi-layered lip seal of claim 1, wherein the at least one filler of the static layer comprises a conductive filler.

7. The multi-layered lip seal of claim 6, wherein the conductive filler is stainless steel or bronze.

8. The multi-layered lip seal of claim 1, wherein the at least one filler of the static layer comprises an abrasion resistance filler.

9. The multi-layered lip seal of claim 8, wherein the abrasion resistance filler is glass or carbon fiber.

10. The multi-layered lip seal of claim 1, wherein the at least one filler of the dynamic layer is different than the at least one filler of the static layer.

11. The multi-layered lip seal of claim 10, wherein the at least one filler of the dynamic layer is a wear resistant filler.

12. The multi-layered lip seal of claim 11, wherein the wear-resistant filler is a high temperature thermoplastic or a solid lubricant.

13. The multi-layered lip seal of claim 1, wherein a surface of the static layer facing away from the dynamic layer is coated with PTFE.

14. The multi-layered lip seal of claim 1, wherein a surface of the dynamic layer facing away from the static layer is coated with PTFE.

15. The multi-layered lip seal of claim 1, wherein the dynamic layer is directly fused together with the static layer.

16. A multi-layered lip seal, comprising:
  a dynamic layer comprising a radially oriented segment, an axially oriented segment, and a curved segment intermediate the radially oriented segment and the axially oriented segment, wherein the axially oriented segment extends only in an axial direction and is configured to contact a surface to be sealed;
  a static layer directly abutting the dynamic layer and comprising a radially oriented segment, an axially oriented segment, and a curved segment intermediate the radially oriented segment and the axially oriented segment, wherein the axially oriented segment of the static layer is configured to be removed from the surface to be sealed by the dynamic layer;
  wherein the dynamic layer comprises PTFE and the static layer comprises PTFE, and wherein at least one of the dynamic layer or the static layer comprises at least one filler homogenously distributed throughout the PTFE.

* * * * *